US010648491B2

(12) United States Patent
Limb et al.

(10) Patent No.: US 10,648,491 B2
(45) Date of Patent: May 12, 2020

(54) COMPLEX STRESS-ENGINEERED FRANGIBLE STRUCTURES

(71) Applicant: Palo Alto Research Center Incorporated, Palo Alto, CA (US)

(72) Inventors: Scott J. H. Limb, Palo Alto, CA (US); Gregory L. Whiting, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/273,397

(22) Filed: Feb. 12, 2019

(65) Prior Publication Data

US 2019/0186513 A1 Jun. 20, 2019

Related U.S. Application Data

(63) Continuation of application No. 16/025,573, filed on Jul. 2, 2018, now Pat. No. 10,202,990, which is a
(Continued)

(51) Int. Cl.
*C03C 21/00* (2006.01)
*F16B 1/00* (2006.01)
(Continued)

(52) U.S. Cl.
CPC ............... *F16B 1/00* (2013.01); *B32B 17/00* (2013.01); *C03B 23/20* (2013.01); *C03B 23/203* (2013.01);
(Continued)

(58) Field of Classification Search
CPC ....... C03C 27/044; C03C 27/06; C03C 27/10; C03C 2/00; C03C 21/001; C03C 21/002;
(Continued)

(56) References Cited

U.S. PATENT DOCUMENTS 3,397,278 A 8/1968 Pomerantz
3,601,114 A 8/1971 Cook
(Continued)

FOREIGN PATENT DOCUMENTS

DE 102004015546 10/2005
WO 0143228 6/2001

OTHER PUBLICATIONS

File History for U.S. Appl. No. 15/092,313.
(Continued)

*Primary Examiner* — Daniel J Wiley
(74) *Attorney, Agent, or Firm* — Mueting, Raasch & Gebhardt

(57) ABSTRACT

A stress-engineered frangible structure includes multiple discrete glass members interconnected by inter-structure bonds to form a complex structural shape. Each glass member includes strengthened (i.e., by way of stress-engineering) glass material portions that are configured to transmit propagating fracture forces throughout the glass member. Each inter-structure bond includes a bonding member (e.g., glass-frit or adhesive) connected to weaker (e.g., untreated, unstrengthened, etched, or thinner) glass member region(s) disposed on one or both interconnected glass members that function to reliably transfer propagating fracture forces from one glass member to other glass member. An optional trigger mechanism generates an initial fracture force in a first (most-upstream) glass member, and the resulting propagating fracture forces are transferred by way of inter-structure bonds to all downstream glass members. One-way crack propagation is achieved by providing a weaker member region only on the downstream side of each inter-structure bond.

20 Claims, 9 Drawing Sheets

Related U.S. Application Data continuation of application No. 15/092,313, filed on Apr. 6, 2016, now Pat. No. 10,012,250.

(51) Int. Cl.
| | |
|---|---|
| *B32B 17/00* | (2006.01) |
| *C03C 27/06* | (2006.01) |
| *C03C 27/10* | (2006.01) |
| *C03B 27/00* | (2006.01) |
| *C03B 23/203* | (2006.01) |
| *C03B 23/20* | (2006.01) |
| *C03C 15/00* | (2006.01) |
| *C03C 27/04* | (2006.01) |
| *B32B 17/10* | (2006.01) |

(52) U.S. Cl.
CPC .............. *C03B 27/00* (2013.01); *C03C 15/00* (2013.01); *C03C 21/00* (2013.01); *C03C 21/001* (2013.01); *C03C 21/002* (2013.01); *C03C 27/044* (2013.01); *C03C 27/06* (2013.01); *C03C 27/10* (2013.01); *B32B 17/10137* (2013.01)

(58) Field of Classification Search
CPC ......... C03B 15/00; C03B 27/00; C03B 23/20; B32B 17/00
See application file for complete search history.

(56) References Cited

U.S. PATENT DOCUMENTS

| | | | |
|---|---|---|---|
| 3,666,967 A | 5/1972 | Keister et al. |
| 3,673,667 A | 7/1972 | Lowenstein et al. |
| 3,882,323 A | 5/1975 | Smolker |
| 4,102,664 A | 7/1978 | Dunbaugh, Jr. |
| 4,139,359 A | 2/1979 | Johnson et al. |
| 4,598,274 A | 7/1986 | Holmes |
| 4,673,453 A | 6/1987 | Georgi |
| 5,374,564 A | 12/1994 | Bruel |
| 7,002,517 B2 | 2/2006 | Noujeim |
| 7,153,758 B2 | 12/2006 | Hata et al. |
| 7,554,085 B2 | 6/2009 | Lee |
| 7,880,248 B1 | 2/2011 | Pham et al. |
| 8,130,072 B2 | 3/2012 | De Bruyker et al. |
| 9,154,138 B2 | 10/2015 | Limb et al. |
| 9,294,098 B2 | 3/2016 | Shah et al. |
| 9,356,603 B2 | 5/2016 | Limb et al. |
| 9,577,047 B2 | 2/2017 | Chua et al. |
| 9,630,870 B2 | 4/2017 | Zhao et al. |
| 9,780,044 B2 | 10/2017 | Limb et al. |
| 10,012,250 B2 | 7/2018 | Limb et al. |
| 10,026,579 B2 | 7/2018 | Whiting et al. |
| 10,026,651 B1 | 7/2018 | Limb et al. |
| 2004/0031966 A1 | 2/2004 | Forrest |
| 2004/0222500 A1 | 11/2004 | Aspar et al. |
| 2005/0061032 A1 | 3/2005 | Yoshizawa |
| 2005/0084679 A1 | 4/2005 | Sglavo et al. |
| 2005/0176573 A1 | 8/2005 | Thoma et al. |
| 2006/0138798 A1 | 6/2006 | Oehrlein |
| 2006/0270190 A1 | 11/2006 | Nastasi et al. |
| 2007/0113886 A1 | 5/2007 | Arao et al. |
| 2008/0029195 A1 | 2/2008 | Lu |
| 2008/0311686 A1 | 12/2008 | Morral et al. |
| 2009/0086170 A1 | 4/2009 | El-Ghoroury et al. |
| 2010/0035038 A1 | 2/2010 | Barefoot et al. |
| 2010/0133641 A1 | 6/2010 | Kim |
| 2010/0225380 A1 | 9/2010 | Hsu et al. |
| 2011/0048756 A1 | 3/2011 | Shi et al. |
| 2011/0089506 A1 | 4/2011 | Hoofman et al. |
| 2011/0183116 A1 | 7/2011 | Hung et al. |
| 2012/0052252 A1 | 3/2012 | Kohli et al. |
| 2012/0135177 A1 | 5/2012 | Comejo et al. |
| 2012/0135195 A1 | 5/2012 | Glaesemann et al. |
| 2012/0196071 A1 | 8/2012 | Comejo et al. |
| 2012/0288676 A1 | 11/2012 | Sondergard et al. |
| 2013/0037308 A1 | 2/2013 | Wang et al. |
| 2013/0082383 A1 | 4/2013 | Aoya |
| 2013/0140649 A1 | 6/2013 | Rogers et al. |
| 2013/0192305 A1 | 8/2013 | Black et al. |
| 2014/0091374 A1 | 4/2014 | Assefa et al. |
| 2014/0103957 A1 | 4/2014 | Fritz et al. |
| 2014/0266946 A1 | 9/2014 | Billy et al. |
| 2014/0300520 A1 | 10/2014 | Nguyen et al. |
| 2014/0323968 A1 | 10/2014 | Rogers et al. |
| 2015/0001733 A1 | 1/2015 | Karhade |
| 2015/0044445 A1 | 2/2015 | Garner et al. |
| 2015/0076677 A1 | 3/2015 | Ebefors |
| 2015/0089977 A1 | 4/2015 | Li |
| 2015/0102852 A1 | 4/2015 | Limb et al. |
| 2015/0121964 A1 | 5/2015 | Zhao et al. |
| 2015/0229028 A1 | 8/2015 | Billy et al. |
| 2015/0232369 A1 | 8/2015 | Majanovic et al. |
| 2015/0318618 A1 | 11/2015 | Chen et al. |
| 2015/0348940 A1 | 12/2015 | Woychik |
| 2015/0358021 A1 | 12/2015 | Limb et al. |
| 2015/0372389 A1 | 12/2015 | Chen et al. |
| 2016/0122225 A1 | 5/2016 | Wada et al. |
| 2016/0137548 A1 | 5/2016 | Cabral, Jr. et al. |
| 2017/0036942 A1 | 2/2017 | Abramov et al. |
| 2017/0217818 A1 | 8/2017 | Dumenil et al. |
| 2017/0292546 A1 | 10/2017 | Limb et al. |
| 2018/0005963 A1 | 1/2018 | Limb et al. |
| 2018/0033577 A1 | 2/2018 | Whiting et al. |
| 2018/0033742 A1 | 2/2018 | Chua et al. |
| 2018/0114761 A1 | 4/2018 | Chua et al. |
| 2018/0306218 A1 | 10/2018 | Limb et al. |
| 2018/0330907 A1 | 11/2018 | Whiting et al. |

OTHER PUBLICATIONS

File History for U.S. Appl. No. 15/629,506.
File History for U.S. Appl. No. 15/726,944.
File History for U.S. Appl. No. 16/025,573.
File History for U.S. Appl. No. 16/033,783.
Limb et al., U.S. Appl. No. 15/726,944, filed Oct. 6, 2017.
Murphy et al., U.S. Appl. No. 15/981,328, filed May 16, 2018.
Limb et al., U.S. Appl. No. 16/025,573, filed Jul. 2, 2018.
File History for U.S. Appl. No. 14/796,440, 183 pages.
File History for U.S. Appl. No. 15/092,313, 195 pages.
File History for U.S. Appl. No. 15/220,164, 192 pages.
File History for U.S. Appl. No. 15/220,221, 198 pages.
File History for U.S. Appl. No. 15/629,506, 121 pages.
File History for U.S. Appl. No. 15/689,566, 188 pages.
File History for U.S. Appl. No. 15/726,944, 130 pages.
File History for U.S. Appl. No. 16/025,573, 153 pages.
File History for U.S. Appl. No. 16/033,783, 105 pages.

COMPLEX STRESS-ENGINEERED FRANGIBLE STRUCTURES

RELATED APPLICATIONS

This application is a continuation of U.S. Ser. No. 16/025,573, filed Jul. 2, 2018, which is a continuation of U.S. Ser. No. 15/092,313, filed Apr. 6, 2016, now U.S. Pat. No. 10,012,250, which are incorporated herein by reference in their entireties.

STATEMENT REGARDING FEDERALLY SPONSORED RESEARCH AND DEVELOPMENT

This invention is based upon work supported by DARPA under Contract No. HR001-16-C-0087 [New] Only-dust. Therefore, the Government has certain rights to this invention.

FIELD OF THE INVENTION

This invention relates to frangible structures, and in particular to frangible structures formed using stress-engineered frangible materials.

BACKGROUND OF THE INVENTION

Frangible materials are materials, such as glass, that tend to break up into fragments when subjected to a deforming force or impact, as compared with non-frangible materials that elastically deform and retain cohesion when subjected to comparable deforming forces. The phrase "glass material" refers to any of various amorphous frangible materials formed from a melt by cooling to rigidity without crystallization. The most commonly known glass materials are usually transparent or translucent material consisting typically of a mixture of silicates, but the phrase "glass material" is not limited to silicate-based glass unless otherwise specified.

Frangible structures (i.e., structures formed using one or more frangible materials) are utilized in a wide range of practical applications ranging from small and simple to large and complex. Most frangible structures are designed to undergo structural failure (break away) when struck by an externally applied impact force. For example, light poles or airport lighting structures are designed to break away when hit by a vehicle or plane in order to lessen damage to the vehicle/plane and minimize injury to the passengers. Some frangible structures are designed to undergo structural failure in response to an externally generated command signal. For example, transient electronic devices are frangible structures that include one or more electronic devices (e.g., integrated circuit (IC) chip and/or printed electronic devices) mounted on a stress-engineered glass substrate along with a trigger mechanism. The glass material forming the glass substrate is stress-engineered (e.g., intentionally fabricated using thermally tempered, ion-exchange treated, or lamination techniques) to store potential energy in the form of residual internal stress gradients such that, when the stress-engineered glass substrate is subjected to a relatively small initial fracture force generated by the trigger mechanism, the stored potential energy is released in the form of a propagating fracture force that is quickly transferred throughout the glass substrate.

Currently, there are no known methodologies for producing complex frangible structures that undergo on-command structural failure in response to a single initiating force (i.e., where the single initiating force has a trigger area much smaller than the overall structural area, preferably smaller than 1 $\mu m^2$). That is, there is no practical way to generate a large complex structure, such as an airplane wing section, from a single (integrally-molded or machined) piece of frangible material. Conversely, when multiple discrete stress-engineered glass structures are adhered together to form the complex shape, propagating fracture forces are unable to transfer from one frangible glass structure to an adjacent frangible glass structure, thereby requiring multiple triggering forces (i.e. one trigger mechanism for each frangible glass structure) to achieve complete structural failure of the entire complex frangible structure.

What is needed is a methodology for generating complex stress-engineered frangible structures that reliably undergoes on-command structural failure in response to a single triggering force with a triggering area much smaller than the structural area.

SUMMARY OF THE INVENTION

The present invention is directed to methods for forming novel inter-structure bonds that function to both structurally connect adjacent discrete glass members, and also to reliably transfer propagating fracture forces between the connected discrete glass members, thereby facilitating the production of complex stress-engineered frangible structures that both exhibit high structural strength during normal operation, and also undergo complete structural failure in response to a single (initial) fracture force during emergency or other operating conditions. Because the method uses separately formed (discrete) glass members that can have any size and shape (e.g., curved shapes, rods, sheets, tubs, or spheres), the method facilitates the production of a wide range of complex stress-engineered frangible structures (i.e., by way of forming the glass members as component structural elements of the assembled complex structure). To facilitate both high structural strength during normal operation and on-command controlled structural failure, each discrete glass member includes a portion that is strengthened by way of stress-engineering to both exhibit enhanced structural strength, and to store potential energy in an amount that transmits propagating fracture forces throughout the glass member in response to a sufficiently large initial fracture force such that the glass member undergoes structural failure (i.e., fracture and/or fragmentation into two or more separate pieces). In alternative embodiments, the strengthened glass portion of each glass member is generated either during formation of the glass member or by treating an already-formed (untreated) glass member using a stress-engineering technique such as thermal tempering, laminating, or ion-exchange treatment. To facilitate both rigid structural connection between adjacent discrete glass members, and also reliable transfer of propagating fracture forces between the connected discrete glass members, each novel inter-structure bond includes a bonding member directly attached to one or more weaker member regions of one or more of the two connected glass members (e.g., with the bonding member connected either between a strengthened glass portion of one glass member and the weaker member region of the other glass member, or between weakened glass portions disposed on both glass members). Because the weaker/weakened glass material of the one or more weaker member regions is more susceptible to fracture (i.e., fractures in response to a lower incident fracture energy), and because the one or more weaker member regions extend into the downstream glass member, the novel inter-structure bonds generated in accordance with the present invention facilitates the reliable transfer of propagating fracture forces from an upstream (first) glass member to an adjacent downstream (second) glass member by way of generating a transfer fracture force, in response to propagating fracture forces in the upstream glass member, that extend into the weaker member region formed in the downstream glass member, thereby generating sufficient fracture energy to produce propagating fracture forces in the downstream glass member. With this basic arrangement, the present invention facilitates reliably generating propagating fracture forces that are sequentially transferred from connected glass member to connected glass member until a desired amount of structural failure is generated in the contiguous complex stress engineered frangible structure. By way of controlling the initial fracture force (e.g., using an optional RF signal controlled trigger mechanism), the present invention thus provides a new class of functional complex frangible structures that disintegrate, lose mass, or otherwise undergo structural failure on command, whether for the safety to an impacting object (e.g., in the case of light poles or airport structures), or to control functionality (e.g., to optimize the trim of a wing or propeller used on an aircraft).

According to an embodiment of the invention, a complex stress-engineered frangible structure capable of on-command structural failure is at least partially produced by assembling "core" structural elements including two (first and second) discrete glass members that are directly connected by way of an intervening inter-structure bond, and an optional trigger mechanism directly connected to the first glass member. As mentioned above, the glass members are separately formed (integral) glass pieces substantially made up of strengthened (stress-engineered) glass portions. The intervening inter-structure bond includes a bonding member sandwiched between opposing surface regions of the first and second glass members, and the optional trigger mechanism is operably attached to an associated surface region of the first glass member. The trigger mechanism is configured to generate, in response to a trigger signal, an initial fracture force in a localized region (point) in the first glass member, thereby producing an initial (first) propagating fracture force in the first glass member that propagates (travels) by way of the strengthened glass material portion to all sections of the first glass member, eventually reaching the surface region of the first glass member to which intervening bonding member is attached. When the initial propagating fracture force is transmitted to the bonding member, the one or more weaker member regions and the bonding member combine to generate a transfer fracture force that passes from the strengthened glass portion of the first (upstream) glass member to the strengthened glass portion of the second (downstream) glass member, where the transfer fracture force has sufficient strength to initiate secondary propagating fracture forces in the second glass member. By extending this methodology to generate complex stress-engineered frangible structures having a large number of additional discrete glass members connected directly or indirectly (i.e., through one or more intervening glass members) by way of associated inter-structure bonds to the first glass member, the single initial fracture force generated by the trigger mechanism is reliably utilized to fragment every glass member forming the contiguous complex frangible structure. Accordingly, the present invention facilitates the production of a wide range of complex stress-engineered frangible structure configurations that undergo on-command structural failure by way of incorporating the "core" elements mentioned above (i.e., the first and second glass members, at least one inter-structure bond, and the trigger mechanism).

According to an exemplary practical approach, complex stress-engineered frangible structures are produced by way of generating a weaker member region in at least one of the upstream and downstream glass members, and then connecting each upstream and downstream glass member pair such that a bonding member (e.g., ceramic adhesive, low temperature glass frit, anodic bonding structures, or chemical bonds) is sandwiched between the upstream and downstream glass members, and such that the bonding member presses against and covers the weaker member region(s). In alternative embodiments, the weaker member region is implemented by weakened glass portions (i.e., localized glass portions that are protected from ion-exchange or other stress-engineering treatment), by weakened surface features (i.e., sections of the glass surface that are etched, laser ablated or otherwise weakened by way of removing glass material from the second glass member through a designated surface region), or by being disposed on a thinner (and thus weaker) section of stress-engineered glass material. The upstream and downstream glass members are then connecting by way of the inter-structure bonds mentioned above such that each bonding member is connected between an associated surface region of an upstream glass member and associated weaker member region of a corresponding downstream glass member (i.e., such that the surface region contacted by the bonding members entirely surrounds/covers the weaker member region). In the specific embodiment involving weakened glass portions, the second glass member is provided by way of procuring or fabricating an untreated (i.e., non-stress-engineered) glass member, masking a designated surface region of the untreated glass member, ion-exchange treating all exposed surfaces the untreated glass member to convert the second glass member into a stress-engineered glass member including the weakened glass portion disposed under the mask, and then removing the mask. In the specific embodiment involving weakened surface features, the second glass member is subjected to stress-engineering, and then features are etched or otherwise formed in the strengthened glass material to form the weakened surface feature. In alternative exemplary embodiments, the weakened surface feature are defined as a single (e.g., square) cavity, an array of cavities formed in a waffle-type pattern, or parallel slots. In each case, the removed untreated material generates a localized weakened region in the downstream glass member that greatly facilitates transfer of propagating fracture forces from the upstream glass member to the downstream glass member.

According to another practical approach, complex stress-engineered frangible structures are produced by way of procuring, fabricating or otherwise providing glass members in an untreated (i.e., non-stress-engineered) state, connecting the glass members using high temperature glass bonding techniques (e.g., high-temperature glass-frit or glass welding) such that a bonding member is connected between opposing surface regions of the glass members, and then subjecting exposed portions of the untreated glass members to an ion-exchange treatment to form stress-engineered glass members connected by an inter-structure bond. In this case, the inter-structure bond includes the bonding member and two weakened glass portions (member regions) that are respectively formed on opposite sides of the bonding member by portions of the two glass members that are shielded during ion-exchange treatment. To avoid structural problems caused by high-temperature bonding, the discrete untreated glass members are respectively formed from glass materials having the same or similar CTE values. In one embodiment, channels are formed in exposed surface portions of the untreated glass members prior to ion-exchange treatment.

According to another embodiment of the present invention, a method is provided for producing a complex frangible structure in which propagating fracture forces are transferrable in only one direction (i.e., only from upstream glass members to downstream glass members, and not in the reverse direction). This feature is useful, for example, when one part of a structure needs to be intact but still structurally bonded to the overall complex structure. Any accidental breakage of the other parts will not affect the structure that needs to stay intact until the very end. This method will ensure a particular user sequence of fracturing will occur in a multi-triggerable system. The method involves producing all glass members in the manner described above such that the glass members are sized and shaped to collectively form a complex frangible structure, with one glass member designated as a first (most-upstream) glass member, one or more glass members designated as the last (most-downstream) glass member(s), and all other glass members designated as intermediate glass members that are downstream to the first glass member and upstream to the last glass member(s). Bonding regions are designated between adjacent associated upstream/downstream pairs of the glass members such that a fracture path is defined from the first glass member to the last glass member(s) by way of any intervening intermediate glass members and inter-structure bonds. To facilitate one-way crack propagation, the weaker member regions (i.e., weakened surface features and/or weakened glass portions) are formed only on the downstream side of each bonding region (i.e., only on the downstream glass member of each associated upstream/downstream glass member pair). The glass members are then interconnected by way of forming inter-structure bonds in the manner described above such that each bonding member is disposed between a strengthened glass portion of the upstream glass member and the weaker member region of the downstream glass member. A trigger mechanism is also connected to the first glass member, either before, during or after the bonding process. The resulting complex frangible structure thus exhibits one-way propagating fracture forces that are initiating in the first glass member by the trigger mechanism, and are sequentially transferred in only one direction (i.e., only from upstream to downstream glass members of each connected upstream/downstream pair) until the facture forces reach the last glass member(s).

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in frangible structures. The following description is presented to enable one of ordinary skill in the art to make and use the invention as provided in the context of a particular application and its requirements. As used herein, directional terms such as "upper", "upward", "lower", "downward", "under" and "over" are intended to provide relative positions for purposes of description, and are not intended to designate an absolute frame of reference. The terms "coupled" and "connected", which are utilized herein, are defined as follows. The term "connected" is used to describe a direct connection between two structural elements, for example, by way of an adhesive or other bonding member. In contrast, the term "coupled" is used to describe either a direct connection or an indirect connection between two structural elements. For example, two coupled elements may be directly connected by way of a bond, or indirectly connected by way of an intervening structural element. The term "integral" is used to refer to a structural element (such as a glass member or piece) that is entirely separately produced by way of molding or machining a single material piece. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
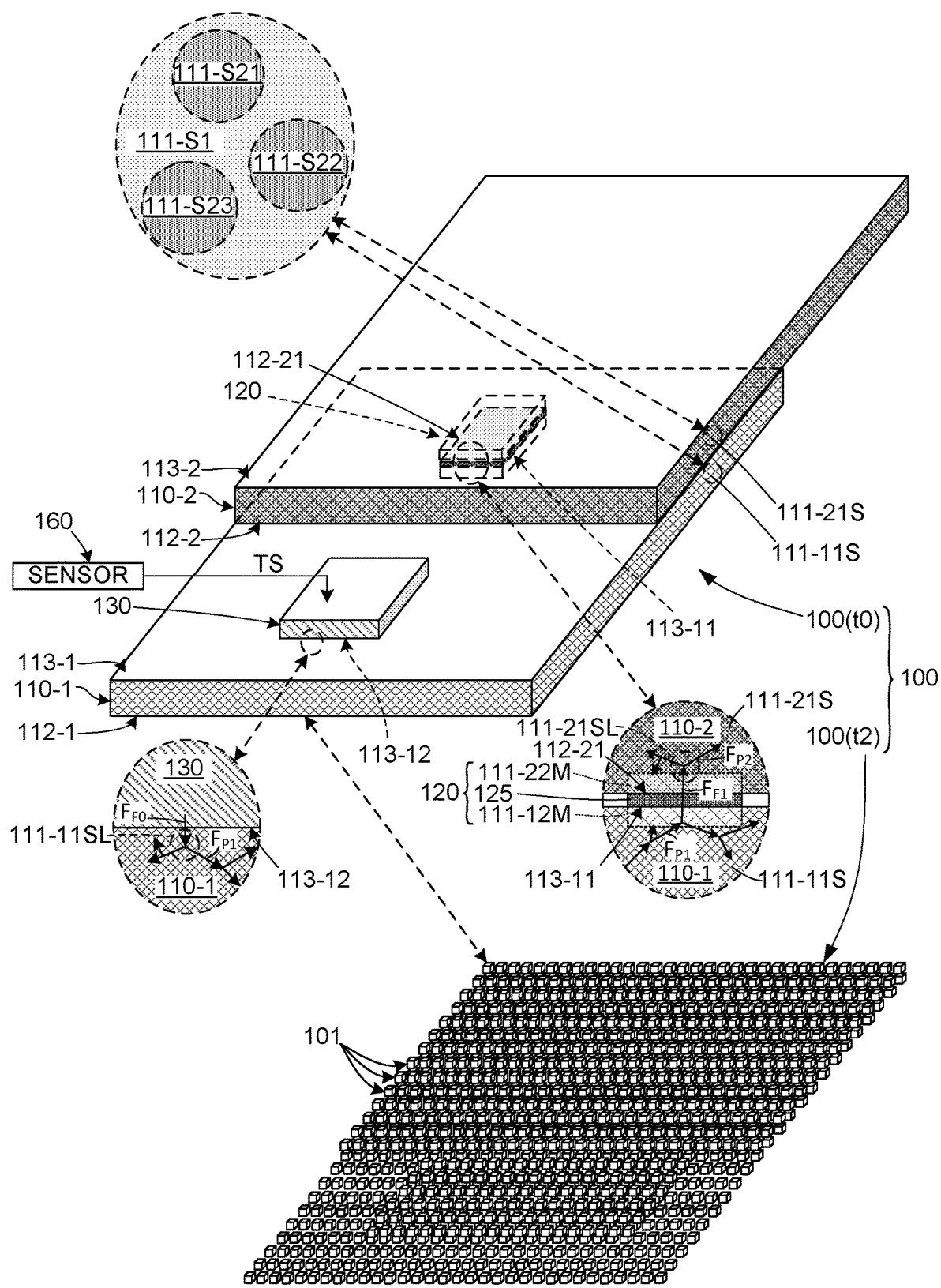
FIG. 1 is a top side perspective view showing a complex stress-engineered frangible structure according to a simplified embodiment of the present invention.

FIG. 1 includes simplified perspective views showing a complex stress-engineered frangible structure 100 in a contiguous state (i.e., frangible structure 100(t0) shown in the middle portion of FIG. 1) and an exemplary fractured state (i.e., frangible structure 100(t2) shown in the lower portion of FIG. 1). In the contiguous state (e.g., immediately after production, during normal operation, and during portions of a transient event occurring prior to fracture), frangible structure 100(t0) generally includes two discrete glass members 110-1 and 110-2, an inter-structure bond 120 and an optional trigger mechanism 130.

As utilized herein, the phrase "discrete glass member" refers to a separate (integral) glass pieces formed using known techniques (i.e., heating the glass material to a molten state, forming the molten glass into a desired final shape, and then cooling the molten glass to room temperature). An advantage to forming complex stress-engineered frangible structure 100 using discrete glass members 110-1 and 110-2 is that combining and bonding discrete glass members facilitates the production of complex structural shapes far more efficiently and with less expense than forming the same complex structural shape from a single integral glass piece.

In order to produce frangible structure 100 such that it both provides sufficient structural strength during normal operation and also undergoes on-command fragmentation (structural failure), it is necessary to fabricate or procure stress-engineered glass members having the characteristics set forth below. Referring to the middle of FIG. 1, glass members 110-1 and 110-2 are depicted as wafer-like structures having opposing upper and lower surfaces 112-1 and 112-2 and 113-1 and 113-2, respectively, but in practice glass members 110-1 and 110-2 can have any practical shape (e.g., curved shapes, rods, sheets, tubs, or spheres). Glass members 110-1 and 110-2 are separately formed (integral) glass pieces mostly comprising strengthened glass portions 111-11S and 111-21S, respectively, where strengthened glass portions 111-11S and 111-21S comprise glass material that has been fabricated or treated using a known stress-engineering technique such as thermal tempering, laminating, or ion-exchange treatment such that strengthened glass portions 111-11S and 111-21S both exhibits substantially higher structural strength than non-stress-engineered glass material of the same type, and stores potential energy in a sufficient amount to generate the propagating fracture forces described below. In a presently preferred embodiment, strengthened glass portions 111-11S and 111-21S of glass members 110-1 and 110-2 comprise ion-exchange treated glass material formed using known techniques. In another exemplary embodiment, as indicated in the upper left bubble of FIG. 1, glass members 110-1 and 110-2 comprise two interspersed thermally tempered glass materials (e.g., with multiple thermally tempered glass material portions 111-S21, 111-S22 and 111-S23 disposed in a different (first) thermally tempered glass material 111-S1. When implemented using ion-exchange treatment or any of the other specific stress-engineering processes mentioned above, glass members 110-1 and 110-2 are configured to contain enough stored potential energy to generate self-propagating secondary fracture forces in response to an initial fracture force such that, as depicted by shattered structure 100(t2) at the bottom of FIG. 1), glass members 110-1 and 110-2 partially or completely break apart into smaller fragments using a mechanism similar to that captured in a Prince Rupert's Drop. In addition, in one embodiment, the released potential energy also fractures portions of optional trigger mechanism 130 and any other structures that might be disposed on glass members 110-1 and 110-2.

As indicated in FIG. 1, inter-structure bond 120 functions to fixedly connect (bond) lower (first) glass member 110-1 to upper (second) glass member 110-2 by way of a bonding member 125 (sandwiched) between an upward-facing surface region 113-11 of first glass member 110-1 and an opposing downward-facing surface region 112-21 of second glass member 110-2. In alternative exemplary embodiments, bonding member 125 is implemented using a ceramic adhesive, a glass-frit structure, an anodic bonding structure, or a chemical bond.

In one embodiment, trigger mechanism 130 is attached to a second surface region 113-12 of first glass member 110-1, and is configured to generate an initial fracture force $F_0$ in glass member 110-1 having sufficient fracture energy to initiate first propagating fracture force $F_{P1}$ in strengthened portion 111-11S of first glass member 110-1. In a specific embodiment, trigger mechanism is controlled by way of an electronic trigger signal TS generated by a sensor 160, which in turn generates trigger signal TS in response to a wireless transmitted wave signal (e.g., a light wave signal, a radio frequency, or an acoustic/sound signal, not shown), whereby frangible structure 100 can be remotely actuated to undergo on-command structural failure. In one embodiment, trigger mechanism 130 generates initial fracture force $F_0$ using a self-limiting resistive element and a switch element that are connected in series between a battery (or other DC power source) and ground in the manner described in co-owned and co-pending U.S. Publication No. 20180033577 which is incorporated herein by reference in its entirety.

According to an aspect of the present invention, bonding member 125 of inter-structure bond 120 is directly attached to at least one weaker member region of at least one of glass members 110-1 and 110-2. Referring to the lower right bubble in FIG. 1, a glass portion 111-12M of glass member 110-1 is depicted by the dashed-line box disposed directly below bonding member 125, and glass portion 111-22M of glass member 110-2 is depicted by the dashed-line box disposed directly above bonding member 125. Note that glass portion 111-12M is contiguous with upper surface region 113-11 of first glass member 110-1, and that glass portion 111-22M is contiguous with lower surface region 112-21 of first glass member 110-1. According to this aspect, at least one of the two glass portions 111-12M and 111-22M comprises a weaker member region (i.e., glass material that is, e.g., either subjected to mechanical alteration or shielded from stress-engineering such that the glass material is structurally weaker than the stress-engineered glass material forming strengthened portions 111-11S and 111-21S). For example, in one exemplary alternative embodiment, all three of strengthened portions 111-11S and 111-21S and glass portions 111-12M comprise ion-exchange treated glass material (i.e., stress-engineered, relatively thick glass material), and glass portion 111-22M comprises the weaker member region (e.g., glass material that is partially or fully shielded from ion-exchange treatment, glass material that has been mechanically weakened, e.g., by way of etching, or relatively thin stress-engineered glass material). Alternatively, all three of strengthened portions 111-11S and 111-21S and glass portion 111-22M comprise strengthened (e.g., ion-exchange treated) glass material, and glass portion 111-12M comprises the weaker member region. In a third example, strengthened portions 111-11S and 111-21S comprise stress-engineered glass material, and both glass portions 111-12M and 111-22M comprise weaker member regions. Detailed examples used to form weaker member regions are provided below.

According to another aspect of the present invention, bonding member 125 and the weaker member region(s) (i.e., either or both of glass portions 111-12M and 11122M) are configured (i.e., operably formed and positioned) to transfer propagating fracture forces $F_{P1}$ from first glass member 110-1 to second glass member 110-2 by way of a transfer fracture force $F_{F1}$ such that secondary propagating fracture forces $F_{P2}$ are generated in strengthened glass portion 111-21S of second glass member 110-2. That is, as depicted in the lower right bubble in FIG. 1, the weaker member region(s) and bonding member 125 produce transfer fracture force $F_{F1}$, which is applied in localized region 111-21SL of strengthened portion 111-21S of glass member 110-2, thereby generating secondary propagating fracture forces $F_{P2}$ in strengthened portion 111-21S of glass member 110-2. Although not illustrated in FIG. 1, secondary propagating fracture forces $F_{P2}$ travel throughout second glass member 110-2 such that glass member 110-2 is fragmented. In this way, initial fracture force $F_{F0}$ generated in first glass member 110-1 by trigger mechanism 130 results in structural failure of second glass member 110-2 by way of secondary propagating fracture forces $F_{P2}$. The inventors found that forming inter-structure bond 120 with one or more weaker member regions adjacent to bonding member 125 greatly facilitates the transfer of propagating fracture forces between two discrete glass members because the weakened glass material of the weaker member region(s) more reliably fractures in response to relatively weak transferred fracture forces. Moreover, by limiting the weaker/weakened glass material to the region immediately adjacent the bonding member 125, the present invention facilitates the transfer of fracture forces between adjacent members without significantly weakening contiguous complex stress-engineered frangible structure 100.

Figure 2:
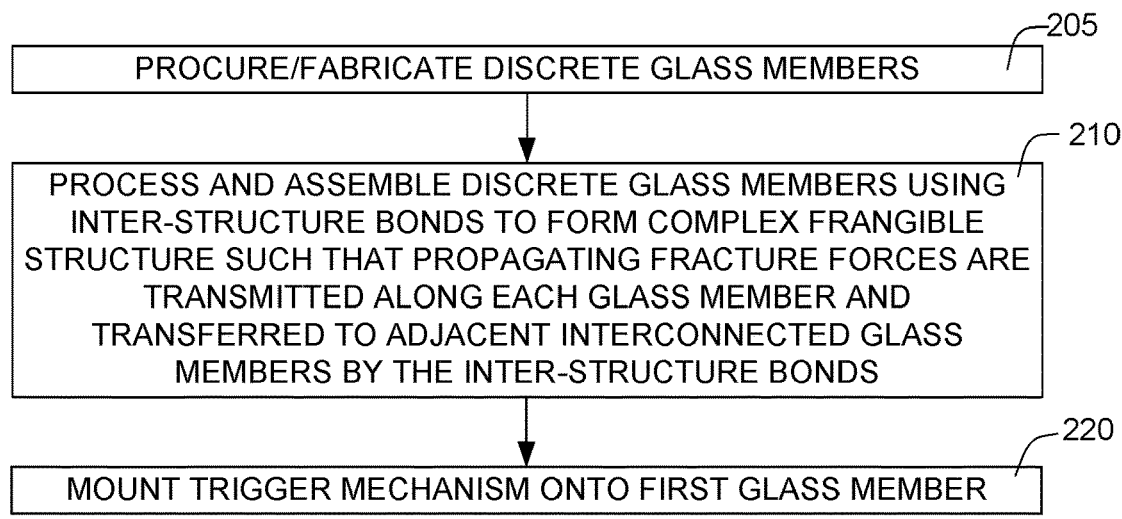
FIG. 2 is a flow diagram showing a generalized method for producing the complex stress-engineered frangible structure of FIG. 1.

FIG. 2 is a flow diagram showing a generalized method for producing complex stress-engineered frangible structures. For brevity, the generalized method is described with reference to the production of the simplified, two-member frangible structure shown in FIG. 1, although those skilled in the art will understand that the described methodology is extendable to form complex stress-engineered frangible structures having any desired shape, size and number of glass elements. The block numbers mentioned below refer to the blocks shown in FIG. 2, and element numbers mentioned below refer to corresponding structures shown in FIG. 1.

Referring to the top of FIG. 2, block 205 involves providing (i.e., fabricating or procuring) discrete glass members having required associated sizes and shapes such that, when operably assembled and interconnected, the provided glass members implement component structural elements that collectively form the complex structural shape of a desired complex stress-engineered frangible structure. Using the simplified embodiment of FIG. 1, providing the glass members involves separately fabricating glass members 110-1 and 110-2 using either normal glass forming techniques or stress-engineering glass fabrication techniques. According to an embodiment of the present invention, providing the discrete glass members includes producing the glass members using normal glass forming techniques (i.e., such that all of the the glass material of each glass member is in an untreated state, i.e., not yet stress-engineered).

Block 210 of FIG. 2 involves processing and assembling (interconnecting) the component glass members using the novel inter-structure bonds described herein to form the desired complex frangible structure. Using frangible structure 100 of FIG. 1 as a simplified example, glass members 110-1 and 110-2 are processed and directly connected using inter-structure bond 120 to glass member 110-2 such that bonding member 125 contacts at least one weaker member region as described above. Note that, once operably processed and connected, glass members 110-1 and 110-2 and inter-structure bond 120 are configured to transfer first propagating fracture forces $F_{P1}$ from strengthened portion 111-11S of glass member 110-1 to strengthened portion 111-21S of glass member 110-2 such that secondary propagating fracture forces $F_{P2}$ are generated in glass member 110-2 in response to transfer fracture force $F_{F1}$.

Referring to the lower portion of FIG. 2, block 220 includes an optional process involving mounting a trigger mechanism onto one of the glass members using known techniques. Using the simplified example of FIG. 1, this process involves mounting trigger mechanism 130 onto upper surface region 113-12 of first glass member 110-1 using a suitable adhesive or other mechanism such that initial fracture force $F_{F1}$ is operably transferred into glass member 110-1. In alternative embodiments, trigger mechanism 130 is mounted onto glass member 110-1 either before or after glass member 110-1 is connected to glass member 110-2 by way of inter-structure bond 120 (i.e., unless otherwise specified, block 220 may be performed before or during block 210).

According to alternative specific embodiments, the generalized production method of FIG. 2 is presented below in additional detail with reference to two alternative approaches. An "After Ion-Exchange Bonding" approach is described below with reference to FIGS. 3, 4(A) to 4(I), and 5(A) to 5(D), and generally involves bonding discrete glass members after the glass members have been subjected to ion-exchange-type stress-engineering treatment treated to patterned stress-engineering treatment. A "Before Ion-Exchange Bonding" approach is then described with reference to FIGS. 6 and 7(A) to 7(G), and generally involves bonding discrete glass members before subjecting the glass members to ion-exchange-type stress-engineering treatment. These two exemplary methods represent currently preferred practical methodologies for implementing the generalized production method of FIG. 2, but are not intended to be limiting unless otherwise specified in the claims.

Figure 3:
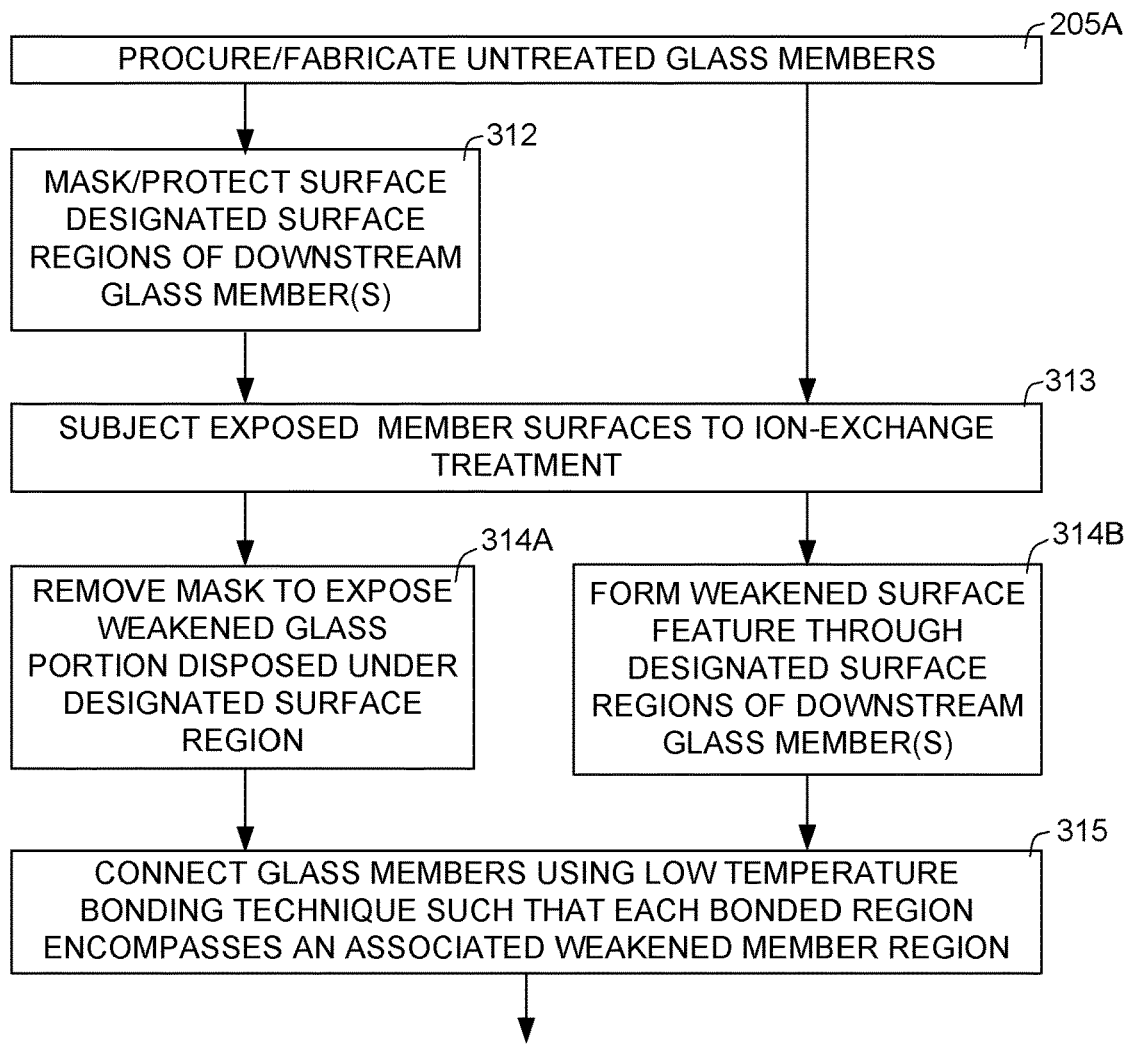
FIG. 3 is a flow diagram depicting an After Ion-Exchange Treatment approach for producing complex stress-engineered frangible structures according to a first practical embodiment.

Referring to FIG. 3, the procuring/fabricating and assembly (blocks 205 and 210, FIG. 2) portion of the generalized production method according to the After Ion-Exchange Bonding approach generally includes forming a weaker member region in each downstream (second) glass member 110A-2, and then connecting upstream (first) glass member 110A-1 to downstream glass member such that a bonding member is sandwiched between the upstream and downstream glass members and presses against and covers the weaker member region(s). The After Ion-Exchange Bonding approach is described with reference to two alternative exemplary practical embodiments: a first practical embodiment including blocks 205A, 312, 313, 314A and 315 involving the generation of a weaker member region in the form of a weakened glass region, and a second practical embodiment including blocks 205A, 312, 313, 314A and 315 involving the generation of a weaker member region in the form of a weakened surface feature. Because the overall process flow of these alternative practical embodiments is substantially the same, the weakened glass region embodiment process (i.e., blocks 205A, 312, 313, 314A and 315 of FIG. 3) will be described with reference to FIGS. 4(A), 4(B1), 4(C1), 4(D1) and 4(E), and the weakened surface feature embodiment process (i.e., blocks 205A, 313, 314B and 315 of FIG. 3) will be described with reference to FIGS. 4(A), 4(B2), 4(C2), 4(D2) and 4(E). Note that FIGS. 4(A) to 4(F) which depict upstream and downstream glass members and associated features in simplified side view.

Figure 4A:
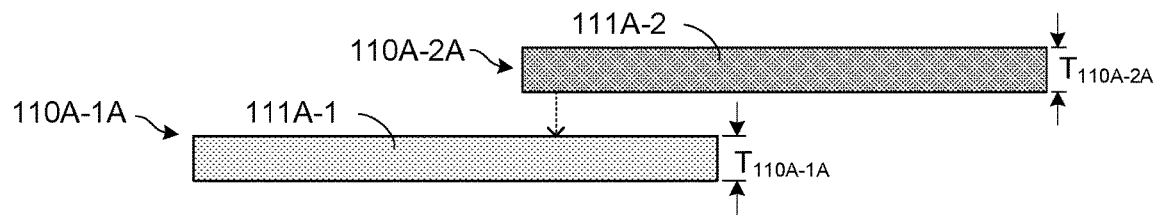
FIGS. 4(A), 4(B1), 4(B2), 4(C1), 4(C2), 4(D1), 4(D2), 4(E), 4(F), 4(G), 4(H) and 4(I) are simplified cross-sectional side views depicting the After Ion-Exchange Treatment approach of FIG. 3.

Referring to block 205A (FIG. 3) and to FIG. 4(A), the "After Ion-Exchange Bonding" production method approach begins with procuring or fabricating (providing) untreated (i.e., non-stress-engineered) glass members 110A-1A and 110A-2A (i.e., such that glass member 110A-1A entirely comprises "weakened" (untreated) glass material 111A-1, and glass member 110A-2A entirely comprises "weakened" glass material 111A-2). According to an aspect of the present embodiment, untreated glass members 110A-1A and 110A-2A can have varying thicknesses (e.g., thickness $T_{110A-1A}$ of glass member 110A-1A can be different from thickness $T_{110A-2A}$ of glass member 110A-2A) because propagating fracture forces (cracks) only occur at a surface of each member.

Figure 4:
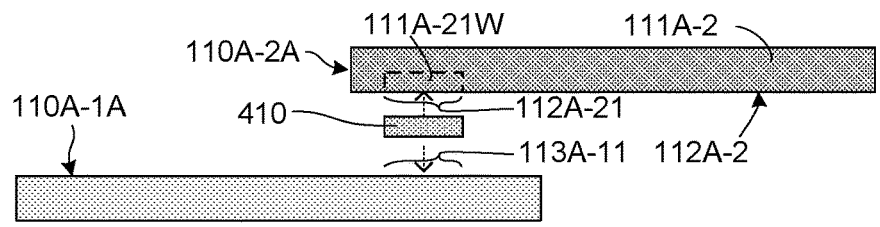
Figure 4:
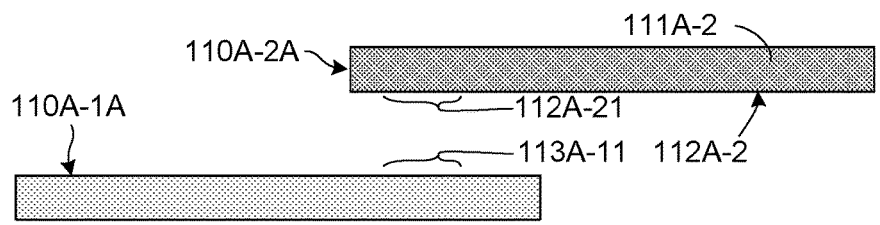
Figure 4:
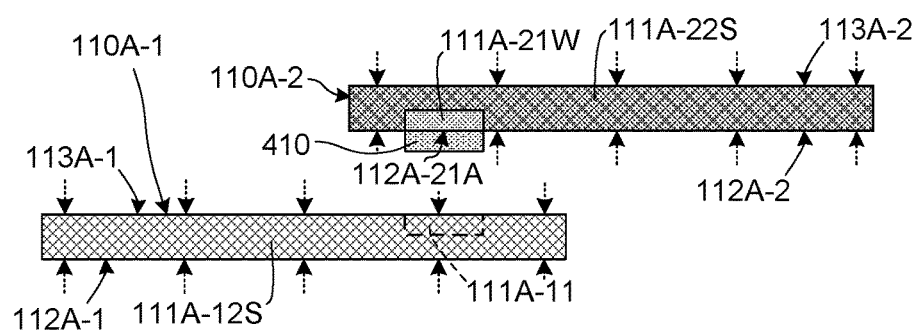
Figure 4:
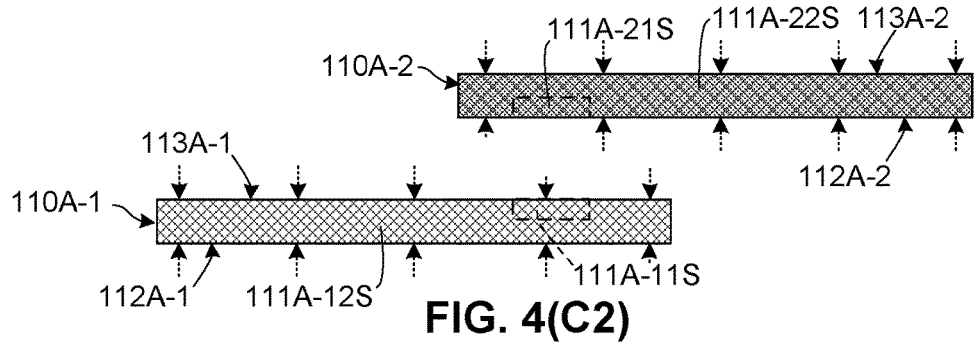
Figure 4:
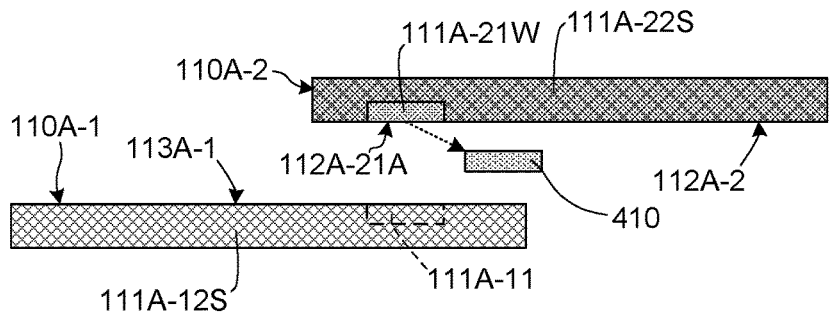
Figure 4:
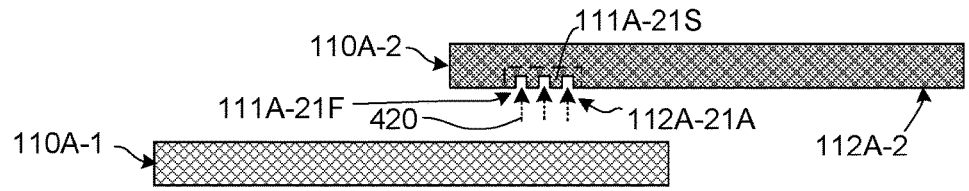

Block 312 and to FIG. 4(B1) are associated with the weakened glass portion embodiment, and involve forming a mask 410 (e.g., photoresist or other material) over a designated surface region 112A-21 of untreated glass member 110A-2A (i.e., over a region of glass member 110A-2A that is designated for weakening). As depicted in FIG. 4(B1), designated surface region 112A-21 to which mask 410 is applied is located under an untreated (and thus "weakened") glass portion 111A-21W of glass member 110A-2A. The shape/pattern of mask 410 is determined by the weakened surface feature pattern to be formed in glass member 110A-2A. Note that no processing of glass member 110A-1A occurs at this time. Note also, as shown in FIG. 4(B2), that no mask is formed in conjunction with the weakened surface feature embodiment at this time.

Referring to block 313 (FIG. 3) and to FIGS. 4(C1) and 4(C2), all exposed surfaces of both untreated glass members 110A-1A and 110A-2A are then subjected to ion-exchange treatment, thereby converting the unprocessed glass members in to stress-engineered glass members 110A-1 and 110A-2 (i.e., having features consistent with glass members 110-1 and 110-2 of FIG. 1). Referring to FIG. 4(C1), according to the weakened glass portion approach, note that the entire upper surface 113A-2 and exposed portions of lower surface 112A-2 are fully ion-exchange treated, but mask 410 limits or entirely prevents ion-exchange treatment from entering weakened glass portion 111A-21A through masked surface region 112A-21A, whereby glass member 110A-2 is processed to include a large strengthened glass portion 111A-22S and a relative small weakened glass portion 111A-21A. In contrast, all regions of upper surface 113A-1 and lower surface 112A-1 of glass member 110A-1 are subjected to ion-exchange treatment. Note also that generating weakened glass portion 111A-21A only on glass member 110A-2 produces a one-way crack propagation bond (i.e., cracks must propagate from glass member 110A-1 to glass member 110A-2). In an alternative embodiment, both sides of the bonded area are masked and weakened. For example, as indicated in FIG. 4(C1), a corresponding region 111A-11 of glass member 110A-1 can be subjected to masking and similarly weakened, which would result in two-way crack propagation. Note also that the surface area of weakened glass portion 111A-21A is always smaller than the bonded area. Referring to FIG. 4(C2), in the weakened surface feature embodiment, because both untreated glass members are entirely exposed, all surfaces 112A-1, 113A-1, 112A-2 and 113A-2 are subjected to ion-exchange treatment, thereby producing stress-engineered glass members 110A-1 and 110A-2 substantially entirely made up of strengthened glass material 111A-12S and 111A-22S (i.e., designated bonding regions 111A-21S and 111A-11S both comprise strengthened glass).

Figure 5A:
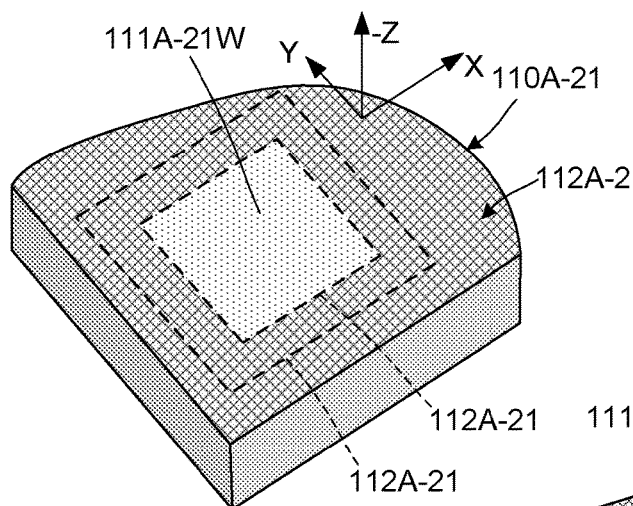
FIGS. 5(A), 5(B), 5(C) and 5(d) are partial perspective views showing weaker member regions generated during the After Ion-Exchange Treatment approach of FIG. 3 according to alternative exemplary specific embodiments.

Referring to block 314A (FIG. 3) and to FIG. 4(D1), the last step of the weakened glass portion approach involves removing mask 410 from glass member 110A-2, thereby exposing designated bonding surface region 112A-21A of glass member 111A-2. FIG. 5(A) depicts an exemplary portion of a glass member 110A-21 indicating an exemplary weakened glass region 111A-21W disposed within designated surface region 112A-22, and indicates that the designated bonding surface region 112A-21 against which the bonding member will be pressed entirely surrounds surface region 112A-22. Referring again to FIG. 4(D1), note also that glass member 111A-2 now includes relatively small weakened glass portion (member region) 111A-21W and relatively large strengthened glass portion 111A-22S. Note also that the corresponding designated bonding region 111A-11 of glass member 111A-1 is strengthened (i.e., stress-engineered using the same process as that used to form strengthened glass portion 111A-21).

Figure 5B:
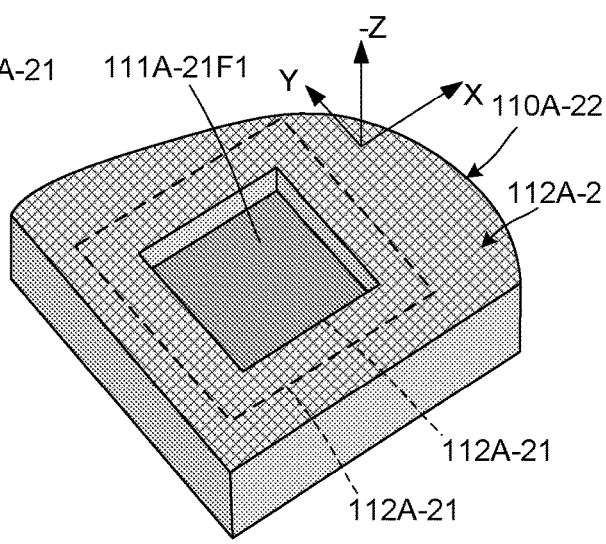
Figure 5C:
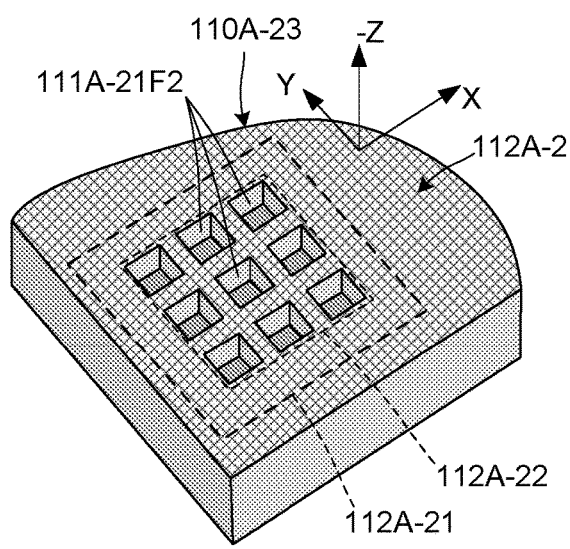
Figure 5D:
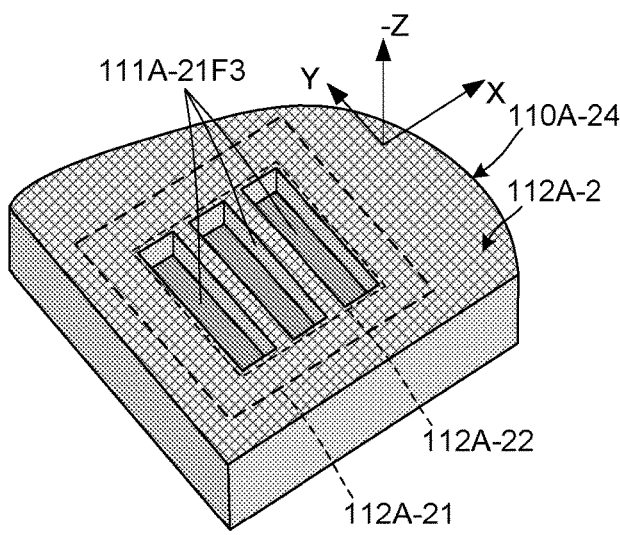

Referring to block 314B (FIG. 3) and to FIG. 4(D2), the next step of the weakened surface feature embodiment involves forming weakened surface feature 111A-21F in glass member 110A-2 by way of removing glass material from strengthened portion 111A-21S through designated surface region 112A-22. In one specific embodiment, this glass removal process is achieved by etching (i.e., applying a suitable chemical etchant 420 using known techniques) designated surface region 112A-22 to define one or more cavities in glass member 110A-2. FIGS. 5(B) to 5(D) depict simplified exemplary weakened surface features 111A-21F1 to 111A-21F3. FIG. 5(B) depicts a single (e.g., square) cavity weakened surface features 111A-21F1 etched through surface region 112A-21 of lower surface 112A-2 of a glass member 110A-22 entirely within designated bonding surface region 112A-21. FIG. 5(C) depicts a second weakened surface feature 111A-21F2 including multiple adjacent cavities arranged in a checkerboard or waffle-type pattern that are etched through surface region 112A-21 of lower surface 112A-2 of glass member 110A-22 and entirely within designated bonding surface region 112A-21). FIG. 5(D) depicts a third (slot or line-type) weakened surface feature 111A-21F3 etched through surface region 112A-21 lower surface 112A-2 of glass member 110A-23 and entirely designated bonding surface region 112A-21). The size of weakened surface features 111A-21F1 to 111A-21F3 is determined by the glass materials and other conditions, and the inventors presently believe that features occupying surface regions as small as 1 µm by 1 µm may be utilized.

Figure 4E:
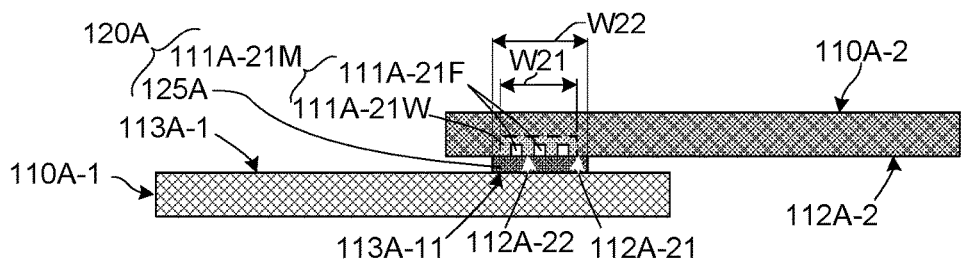

Referring to block 315 (FIG. 3) and to FIG. 4(E), the first glass member 11A-1 is then connected to second glass member 110A-2 using a bonding member 125A and an associated low-temperature (i.e., less than 400° C.) bonding technique, thereby completing bond 120A including bonding member 125A and weaker member region 111A-21M (i.e., one of weakened glass portion 111A-21W or weakened surface features 111A-21F, which are transposed in FIG. 4(E) for illustrative purposes). In alternative specific embodiments, connecting glass members 110A-1 and 110A-2 includes utilizing one of a ceramic adhesive, a low temperature glass-frit, an anodic bonding structure, and a chemical bond to form bonding member 125A. Note that width W22 of contact surface region 112A-22 that is contacted by glass member 125A is larger than width W21 of designated surface region 112A-21, which defines the width of weaker member region 111A-21M. That is, as indicated in additional detail in FIGS. 5(A) to 5(D), in each instance the area of contact surface region 112A-22 entirely surrounds weakened glass portion 111A-21W and weakened surface features 111A-21F1 to 11A-21F3. Depending on bonding temperature, glass members 110A-1 and 110A-2 may be formed using glass materials having different coefficient of thermal expansion (CTE) values (i.e., the lower the bonding process temperature, the greater the difference in CTE between the two glass members).

Figure 4F:
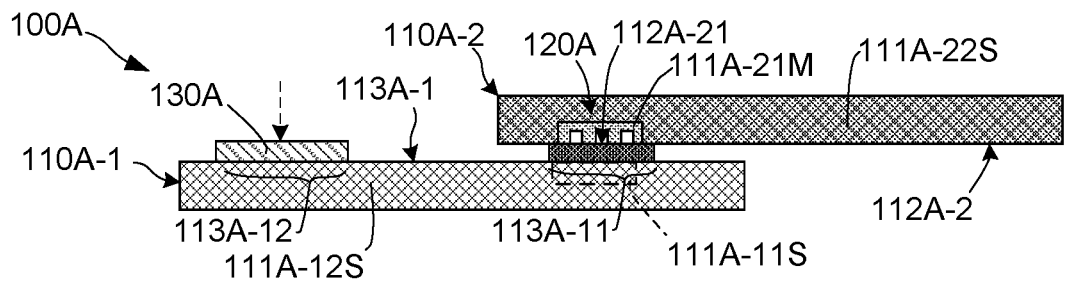

Referring again to the bottom of FIG. 3 and to FIG. 4(F), subsequent production processing includes mounting (operably attaching) trigger mechanism onto a corresponding surface region 113A-12 of upper surface 113A-1 on glass member 110A-1, thereby completing the production of complex stress-engineered frangible structure 100A according to the "After Ion-Exchange Bonding" approach. Note that frangible structure 100A is characterized by weaker member region 111A-21M disposed on second glass member 110A-2, and that bonding member 125A is sandwiched between surface region 113A-21 of glass member 110A-1 and corresponding surface region 112A-21 of glass member 110A-2, where the bonded surface region 112A-21 entirely surrounds weaker member region 111A-21M, as discussed above with reference to FIGS. 5(A) to 5(D). In effect, bonding member 125A is connected between weaker member region 111A-21M of downstream glass member 111A-2 and strengthened glass portion 111A-11S of upstream glass member 111A-1. In this state, complex stress-engineered frangible structure 100A is ready to deploy.

Figure 4G:
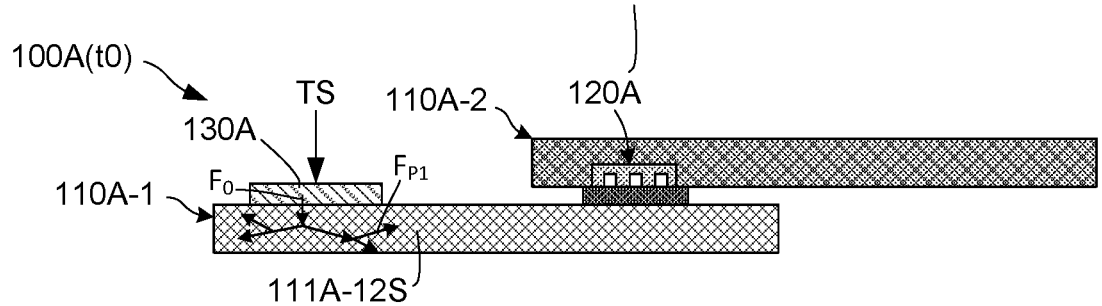
Figure 4H:
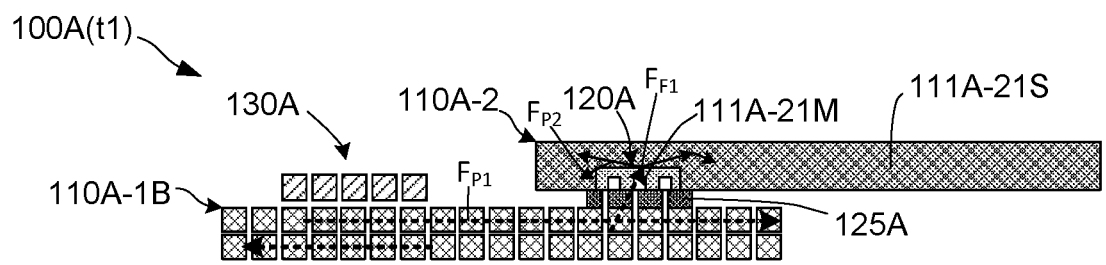
Figure 4I:
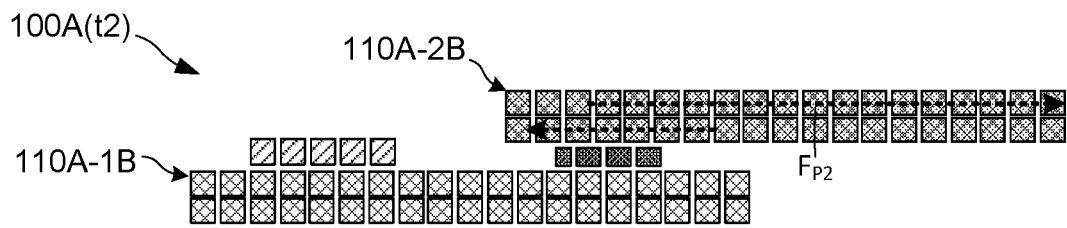

FIGS. 4(G) to 4(I) depict a simplified structural failure of complex stress-engineered frangible structure 100A by way of a one-way crack (fracture) propagation pattern. Referring to FIG. 4(G), a time (t0) represents a moment that on-command structural failure of frangible structure 100A is desired, and is initiated by way of applying trigger signal TS to trigger mechanism 130A. As explained above, trigger mechanism 130A is configured to generate an initial fracture force $F_{F0}$ in response to trigger signal TS, where initial fracture force $F_{F0}$ has sufficient energy to generate a first propagating fracture force $F_{P1}$ in strengthened portion 111A-12S of glass member 110A-1. Note that that, at time to, first propagating fracture force $F_{P1}$ has not yet reached inter-structure bond 120A, so glass member 110A-2 remains entirely intact and un-fractured. FIG. 4(H) shows frangible structure 100A at a subsequent time (t1) when propagating fracture force $F_{P1}$ has traveled throughout glass member 110A-1 and reached inter-structure bond 120A. As described above, bonding member 125A and weaker member region 111A-21M (which includes, e.g., either weakened glass portion 111A-21W shown in FIG. 4(D1) or weakened surface feature 111A-21F shown in FIG. 4(D2)) are configured to transfer first propagating fracture forces $F_{P1}$ by way of secondary fracture force $F_{F1}$ from glass member 110A-1 adjacent glass member 110A-2 such that secondary propagating fracture forces $F_{P2}$ are generated in strengthened glass portion 111A-21S of glass member 110A-2. FIG. 4(I) shows frangible structure 100A at a subsequent time (t2) when secondary propagating fracture forces $F_{P2}$ propagate through glass member 110B-2, whereby a single initial fracture force $F_{F0}$ generated in glass member 110A-1 by trigger mechanism 130A results in structural failure of second glass member 110A-2.

The "Before Ion-Exchange Bonding" production method approach and subsequent on-command structural failure will now be described with reference to FIG. 6 and to FIGS. 7(A) to 7(H).

Figure 6:
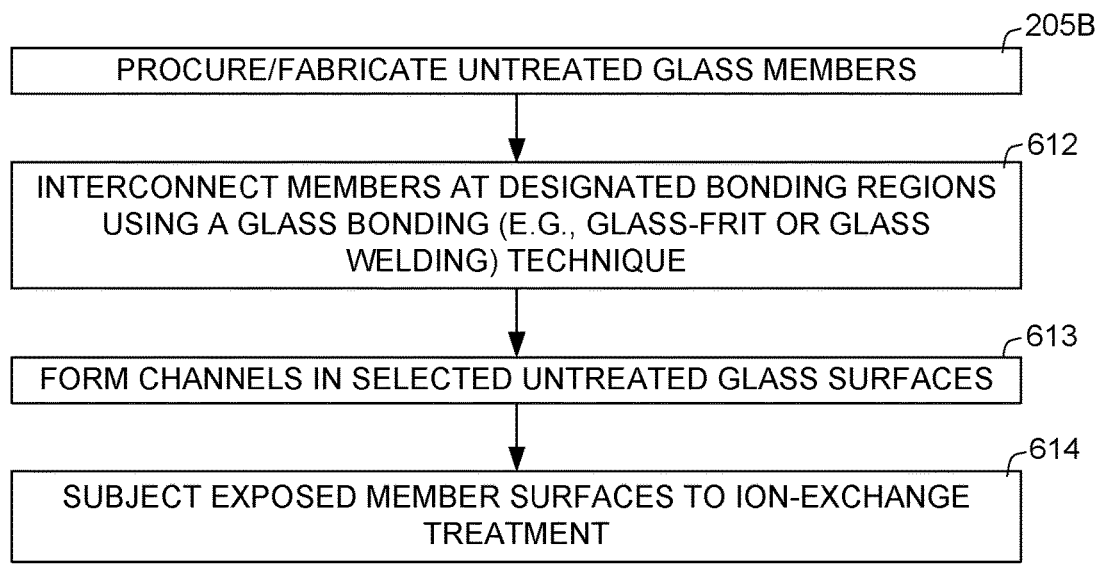
FIG. 6 is a flow diagram showing a Before Ion-Exchange Treatment approach for producing complex stress-engineered frangible structures according to a second practical embodiment.
Figure 7A:
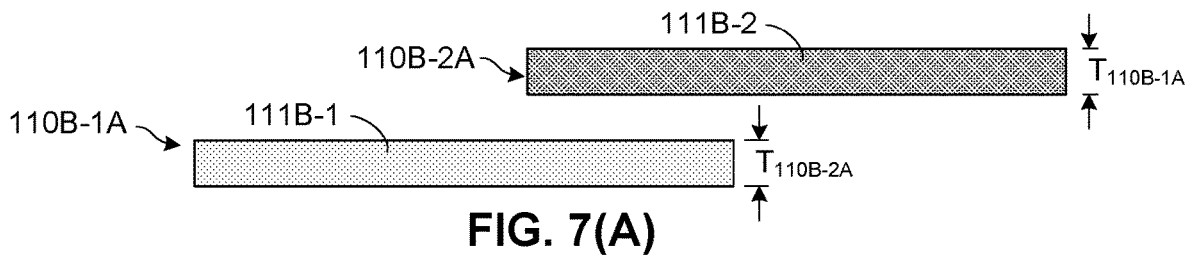
FIGS. 7(A), 7(B), 7(C), 7(D), 7(E), 7(F), 7(G) and 7(H) are simplified cross-sectional side views depicting the Before Ion-Exchange Treatment approach of FIG. 6.

Referring to block 205B (FIG. 6) and to FIG. 7(A), the "Before Ion-Exchange Bonding" production method approach begins with procuring or fabricating (providing) untreated (i.e., non-stress-engineered) glass members 110B-1A and 110B-2A (i.e., glass members 110B-1A and 110B-2A entirely comprise "weakened" (untreated) glass material 111B-1 and 111B-2, respectively). According to an aspect of the "Before Ion-Exchange Bonding" approach, untreated glass members 110B-1A and 110B-2A preferably have similar thicknesses (i.e., thickness $T_{110B-1A}$ of glass member 110B-1A is substantially equal to thickness $T_{110B-2A}$ of glass member 110B-2A) in order to avoid CTE related issues associated with high-temperature bonding and subsequent processing. However, the component member thicknesses may be varied is some instances to vary the fracturing and strength properties of the contiguous frangible structure.

Figure 7B:
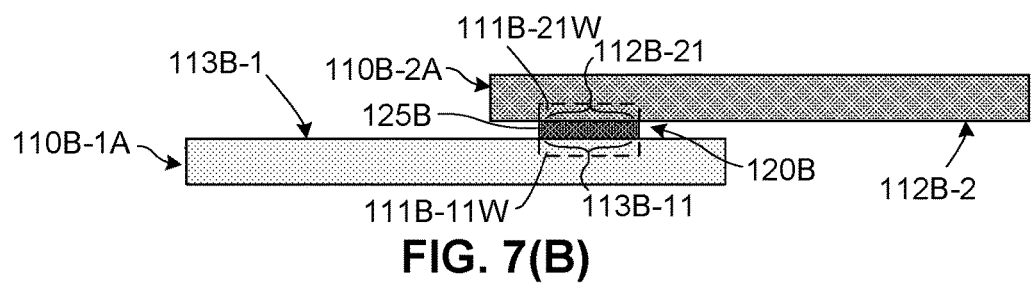

Referring to block 612 and to FIG. 7(B), an inter-structure bond 120B is formed by connecting a designated surface bonding region 113B-11 on upper surface 113B-1 of glass member 110B-1A to an opposing designated surface region 112B-21 on lower surface 112B-2 of glass member 110B-2A by way of an intervening glass bonding member 125B (e.g., a high-temperature glass-frit structure, or a glass welding structure). In this case, inter-structure bond 120B includes glass bonding member 125B, a first weakened glass portion 111B-11W disposed in untreated glass member 110B-1A adjacent to designated surface region 113B-11, and a second weakened glass portion 111B-21W disposed in untreated glass member 110B-2A adjacent to designated surface region 112B-21. These regions are designated by dashed lines in FIG. 7(B) to indicate that these regions remain contiguous with the remaining untreated glass material forming untreated glass members 111B-1A and 111B-2A. Note that weakened glass portions 111B-11W and 111B-21W become the weaker member regions of the to-be-completed inter-structure bond.

Figure 7C:
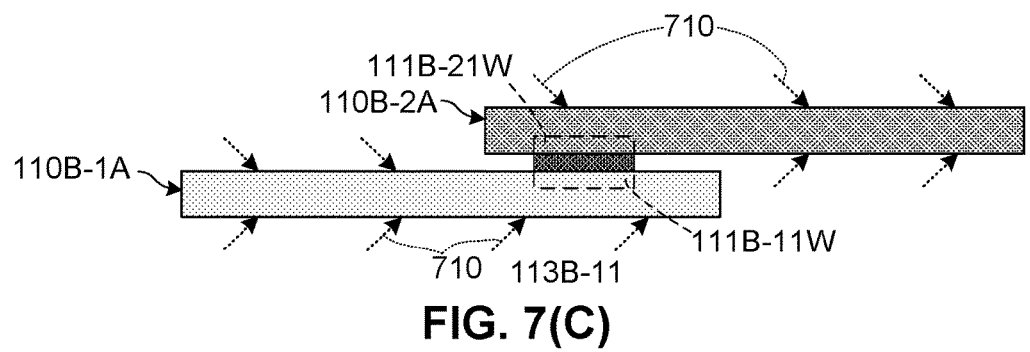
Figure 7D:
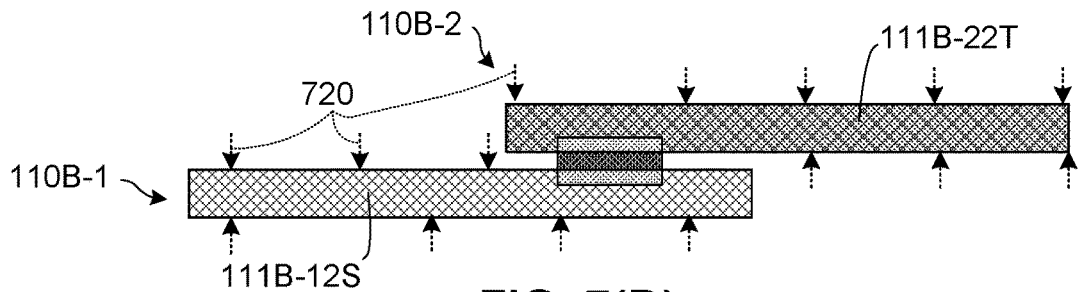

Referring to blocks 613 and 614 and to FIGS. 7(C) and 7(D), exposed portions of untreated glass members 110B-1A and 110B-2A are then exposed to an ion-exchange treatment such that untreated glass members 110B-1A and 110B-2A are converted into stress-engineered glass members 110B-1 and 110B-2, respectively, that are connected by inter-structure bond 120B. Referring to block 613 and to FIG. 7(C), in one embodiment channels are formed in exposed surface portions of untreated glass members 110B-1A and 110B-2A using a suitable channel forming process 710. Note that the channels are formed so as not to allow ion-exchange treatment of weakened glass portions 111B-11W and 111B-21W. Referring to block 614 and FIG. 7(D), glass members 110B-1 and 110B-2 are then exposed to ion-exchange treatment, where the channels mentioned above facilitate treatment of all desired surfaces in the chemical bath, and provide paths for the chemical to be drained and rinsed from glass members 110B-1 and 110B-2 after being pulled out of the bath.

Figure 7E:
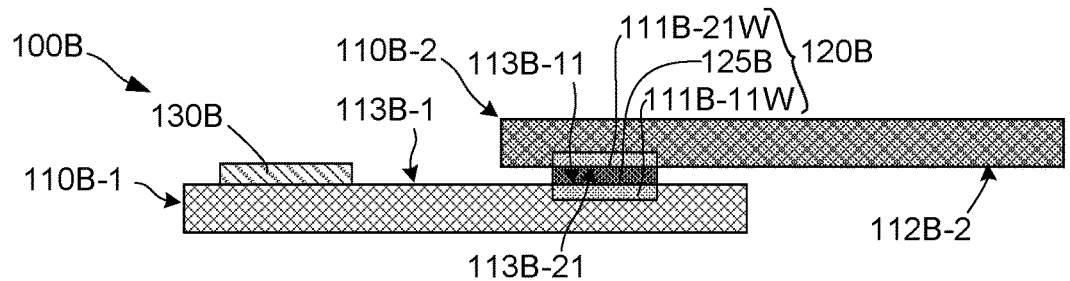

Referring again to the bottom of FIG. 6 and to FIG. 7(E), subsequent production processing includes mounting (operably attaching) trigger mechanism 130B onto a corresponding surface region on upper surface 113B-1 of glass member 110B-1, thereby completing the production of complex stress-engineered frangible structure 100B according to the "Before Ion-Exchange Bonding" approach. Note that frangible structure 100B is characterized in that inter-structure bond 120B includes weakened glass portions (member regions) 111B-11W and 111B-21W disposed glass members 110B-1 and 110B-2, respectively, and bonding member 125B sandwiched between opposing surface regions 113B-11 and 112B-21 of glass members 110B-1 and 110B-2, respectively. At this point complex stress-engineered frangible structure 100B is ready to deploy.

Figure 7F:
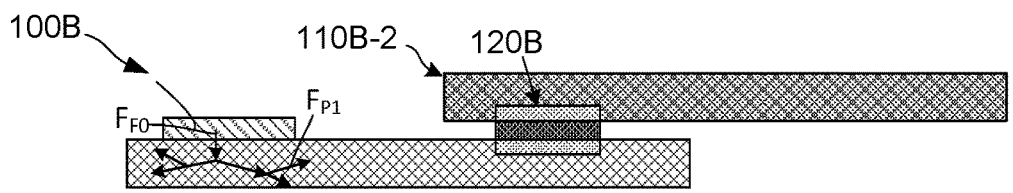
Figure 7G:
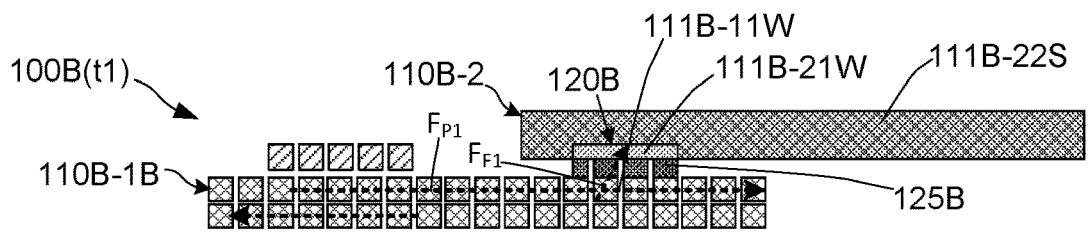
Figure 7H:
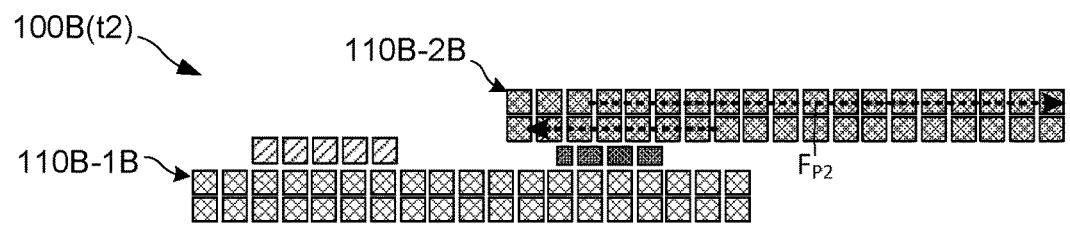

FIGS. 7(F) to 7(H) depict a simulated on-command structural failure of complex stress-engineered frangible structure 100B according to an exemplary embodiment. Referring to FIG. 7(F), at time t(0) the on-command structural failure of frangible structure 100B is initiated by way of actuating trigger mechanism 130B to generate an initial fracture force $F_{F0}$, which in turn generates first propagating fracture force $F_{P1}$ in glass member 110B-1. FIG. 7(G) shows frangible structure 100B at a subsequent time (t1) when propagating fracture force $F_{P1}$ has traveled throughout glass member 110B-1 and reached inter-structure bond 120B. As described above, bonding member 125B and weakened glass portions (member regions) 111B-11W and 111B-21W are configured to transfer first propagating fracture forces $F_{P1}$ by way of secondary fracture force $F_{F1}$ from glass member 110B-1 adjacent glass member 110B-2 such that secondary propagating fracture forces $F_{P2}$ are generated in strengthened glass portion 111B-22S of glass member 110A-2. FIG. 7(H) shows frangible structure 100B at a subsequent time (t2) when secondary propagating fracture forces $F_{P2}$ propagate through glass member 110B-2, whereby structural failure of frangible structure 100B is achieved.

Figure 8:
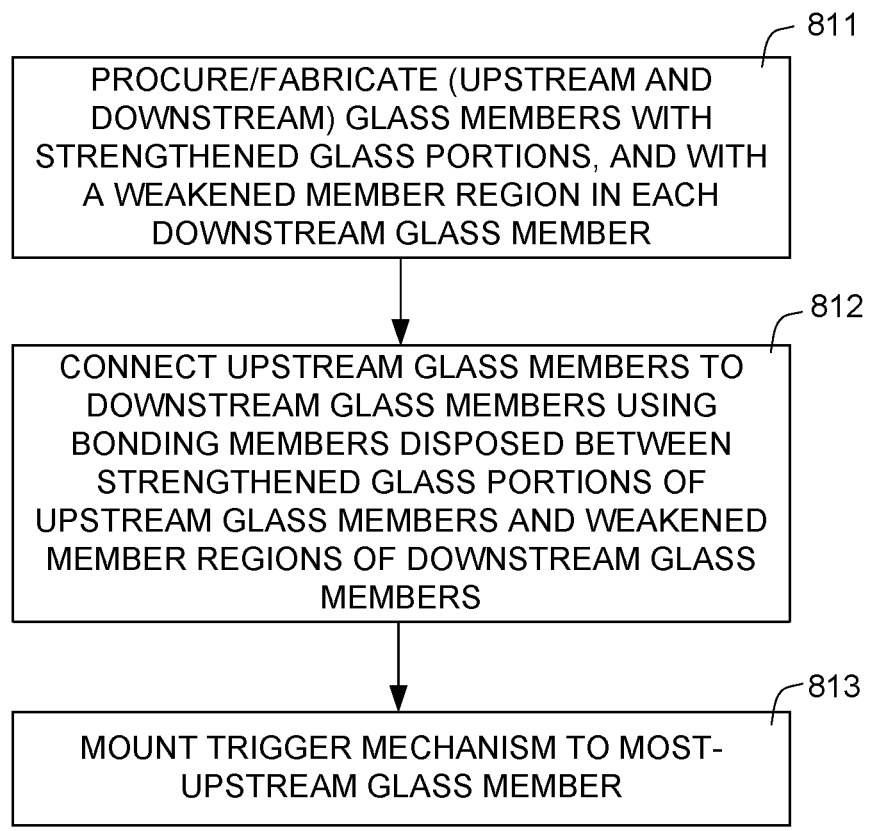
FIG. 8 is a flow diagram showing a method for producing complex stress-engineered frangible structures exhibiting one-way crack propagation according to another embodiment of the present invention.

FIG. 8 is a flow diagram showing a method for producing complex stress-engineered frangible structures in which propagating fracture forces are transferrable in only one direction. The method utilizes processes similar to those described above with reference to FIGS. 4(A) to 4(I), and therefore the method will be described with reference to those figures.

Referring to block 811 in FIG. 8 and to FIG. 4(A), the method begins by producing glass members (e.g., glass members 110A-1 and 110A-2) in the manner described above such that the glass members are sized and shaped to collectively form a desired complex frangible structure 100A. In the case of multiple glass members, one glass member (e.g., glass member 110A-1) is designated as a first (most-upstream) glass member, one or more glass members (e.g., glass member 110A-2) is designated as the last (most-downstream) glass member(s) 110A-2, and all other glass members (not shown in FIG. 4(A)) are designated as intermediate glass members that are downstream to the first glass member (and any other preceding glass members in the crack propagation path) and upstream to the last glass member(s) (and any other subsequent glass members in the crack propagation path). Bonding regions (e.g., referring to FIG. 4(B1), surface regions 113A-11 and 112A-21 of glass members 110A-1 and 110A-2, respectively) are designated between adjacent associated upstream/downstream pairs of the glass members such that a fracture path is defined from the first glass member to the last glass member(s) by way of any intervening intermediate glass members and inter-structure bonds (e.g., in the simplified case of two glass members, from glass member 110A-1 to glass member 110A-2 by way of inter-structure bond 120A). To facilitate one-way crack propagation, weaker member regions (e.g., either weakened surface region 111A-21W shown in FIG. 4(D1) or weakened surface feature 111A-21F shown in FIG. 4(D2)) are formed only on the downstream side of each bonding region (i.e., only on downstream glass member 110A-2 of the associated upstream/downstream glass member pair comprising glass members 110A-1 and 110A-2).

Referring to block 812 (FIG. 8) and to FIGS. 4(E) and 4(F), the glass members are then interconnected by way of forming inter-structure bonds in the manner described above such that each bonding member (e.g., bonding member 125A in FIGS. 4(E) and 4(F)) is disposed between a strengthened glass portion of the upstream glass member (e.g., portion 111A-11S of glass member 110A-1, shown in FIG. 4(E)) and weaker member region 111A-21M of downstream glass member 110A-2.

Referring to block 812 (FIG. 8) and to FIG. 4(F), a trigger mechanism (e.g., mechanism 130A) is also connected to the first glass member (i.e., glass member 110A-1), which is depicted as occurring after the bonding process, but may alternatively occur either before or at any time during the bonding process.

The resulting complex frangible structure, which in a simplified form is generally consistent structure 100A of FIG. 4(F), exhibits one-way crack propagation in which propagating fracture forces can only be transferred from upstream glass members to downstream glass members, and not in the opposite direction. For example, referring to FIGS. 4(G) to 4(I), propagating fracture forces $F_{P1}$ initiated in first glass member 110A-1 (upstream side0 by trigger mechanism 130A are transferred in a downstream direction from upstream glass member 110A-1 to downstream glass member 110A-2 (downstream side) by way of inter-structure bond 120A. In contrast, if a propagating fracture force is unintentionally initiated in downstream glass member 110A-2 (e.g., due to inadvertent impact by a flying rock), the one-way crack propagation approach would prevent transfer of propagating fracture forces from glass member 110A-2 to upstream glass member 110A-1.

Although the present invention has been described with respect to certain specific embodiments, it will be clear to those skilled in the art that the inventive features of the present invention are applicable to other embodiments as well, all of which are intended to fall within the scope of the present invention. For example, although the exemplary embodiments show complex stress-engineered frangible structures comprisingonly two glass members, the various features and aspects of the invention set forth above can be used to produce complex stress-engineered frangible structures having any number of interconnected discrete glass members. Moreover, although the exemplary embodiments depict only a single inter-structure bond connecting two discrete glass members, any number of inter-structure bonds may be utilized to connect two discrete glass members, although the use of a single fracture transfer point is presently preferred. Further, other bonding methods (e.g., adhesives) may be used in combination with the disclosed inter-structure bonds to further strengthen the contiguous complex stress-engineered frangible structure.

The invention claimed is:

1. A stress-engineered frangible structure, comprising:
   a plurality of interconnected discrete glass members comprising a first glass member and a second glass member each including at least one strengthened glass portion comprising a stress-engineered glass material, at least the second glass member comprising at least one weakened glass portion; and
   a bonding member connected between the first and second glass members, the bonding member configured to transmit a fracture force propagating from the first glass member to the second glass member with energy sufficient to cause the at least one weakened glass portion of the second glass member to fracture;
   wherein fracture of the at least one weakened glass portion of the second glass member changes functionality of the frangible structure.

2. The stress-engineered frangible structure of claim 1, wherein fracture of the at least one weakened glass portion of the second glass member changes functionality of the frangible structure by a loss of mass of the frangible structure.

3. The stress-engineered frangible structure of claim 1, wherein fracture of the at least one weakened glass portion of the second glass member changes mechanical functionality of the frangible structure.

4. The stress-engineered frangible structure of claim 1, wherein:
   the frangible structure is a component of a machine; and
   fracture of the at least one weakened glass portion of the second glass member changes functionality of the machine component.

5. The stress-engineered frangible structure of claim 1, wherein:

the frangible structure is a movable component of a machine; and fracture of the at least one weakened glass portion of the second glass member changes functionality of the movable machine component.

6. The stress-engineered frangible structure of claim 1, wherein:

the frangible structure is a component of a vehicle; and fracture of the at least one weakened glass portion of the second glass member changes functionality of the vehicle component.

7. The stress-engineered frangible structure of claim 1, wherein fracture of the at least one weakened glass portion of the second glass member changes functionality of electronic circuitry disposed on the frangible structure.

8. The stress-engineered frangible structure of claim 1, wherein fracture of the at least one weakened glass portion of the second glass member changes functionality of one or more electronic devices disposed on the at least one weakened glass portion of the second glass member.

9. The stress-engineered frangible structure of claim 1, further comprising a trigger mechanism operably attached to the first glass member, the trigger mechanism configured to generate an initial fracture force sufficient to initiate transmission of the fracture force from the first glass member to the second glass member.

10. The stress-engineered frangible structure of claim 9, further comprising a sensor configured to detect a predetermined transmitted signal, and configured to generate a trigger signal in response to detection of the predetermined transmitted signal, wherein the trigger mechanism is configured to generate the initial fracture force in response to the trigger signal.

11. A stress-engineered frangible structure, comprising:

a plurality of interconnected discrete glass members comprising a first glass member and a second glass member each including at least one strengthened glass portion comprising a stress-engineered glass material, at least the second glass member comprising at least one weakened glass portion; and a bonding member connected between the first and second glass members, the bonding member configured to transmit a fracture force propagating from the first glass member to the second glass member with sufficient energy to cause the at least one weakened glass portion of the second glass member to fracture;

wherein fracture of the at least one weakened glass portion of the second glass member changes functionality of the frangible structure from a first functional state to a second functional state different from the first functional state.

12. The stress-engineered frangible structure of claim 11, wherein fracture of the at least one weakened glass portion of the second glass member changes functionality of the frangible structure by a loss of mass of the frangible structure.

13. The stress-engineered frangible structure of claim 11, wherein fracture of the at least one weakened glass portion of the second glass member changes mechanical functionality of the frangible structure.

14. The stress-engineered frangible structure of claim 11, wherein:

the frangible structure is a component of a machine; and fracture of the at least one weakened glass portion of the second glass member changes functionality of the machine component.

15. The stress-engineered frangible structure of claim 11, wherein:

the frangible structure is a component of a vehicle; and fracture of the at least one weakened glass portion of the second glass member changes functionality of the vehicle component.

16. The stress-engineered frangible structure of claim 11, wherein:

the frangible structure is a movable component of a machine; and fracture of the at least one weakened glass portion of the second glass member changes functionality of the movable machine component.

17. The stress-engineered frangible structure of claim 11, wherein fracture of the at least one weakened glass portion of the second glass member changes functionality of electronic circuitry disposed on the frangible structure.

18. The stress-engineered frangible structure of claim 11, further comprising a trigger mechanism operably attached to the first glass member, the trigger mechanism configured to generate an initial fracture force sufficient to initiate transmission of the fracture force from the first glass member to the second glass member.

19. A method for producing a stress-engineered frangible structure, the method comprising:

providing a plurality of discrete glass members each including at least one strengthened portion comprising a stress-engineered glass material; and interconnecting the plurality of discrete glass members such that each discrete glass member is connected by way of a bonding member to an adjacent one of the discrete glass members, wherein:

each bonding member is configured to transfer first propagating fracture forces from the at least one strengthened portion of a first glass member to the at least one strengthened portion of an adjacent second glass member such that secondary propagating fracture forces are generated in the adjacent second glass member in response to the transferred first propagating fracture forces sufficient to cause fracture of at least one weakened glass portion of the adjacent second glass member; and fracture of the at least one weakened glass portion of the adjacent second glass member changes functionality of the frangible structure.

20. The method of claim 19, further comprising providing a trigger mechanism configured to generate an initial fracture force in the first glass member, wherein the initial fracture force generated in the first glass member by the trigger mechanism is transferred by way of the bonding members to at least the adjacent second glass member.

* * * * *